(12) United States Patent
Yeh et al.

(10) Patent No.: US 8,220,007 B1
(45) Date of Patent: Jul. 10, 2012

(54) SYSTEMS AND METHODS FOR EXTENSION OF SOFTWARE FEATURES WITHOUT CHANGING THE HOST SOFTWARE BINARY CODE

(75) Inventors: John Yeh, Foster City, CA (US); Jeffrey Ahlquist, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1317 days.

(21) Appl. No.: 11/865,578

(22) Filed: Oct. 1, 2007

(51) Int. Cl.
*G06F 9/44* (2006.01)
(52) U.S. Cl. ........................ 719/331; 719/328; 719/332
(58) Field of Classification Search .................. 719/310, 719/328, 331, 332
See application file for complete search history.

(56) References Cited

U.S. PATENT DOCUMENTS

| | | | | |
|---|---|---|---|---|
| 6,530,075 | B1 * | 3/2003 | Beadle et al. | 717/114 |
| 6,591,418 | B2 * | 7/2003 | Bryan et al. | 717/177 |
| 7,136,857 | B2 * | 11/2006 | Chen et al. | 1/1 |
| 7,136,868 | B2 * | 11/2006 | Sonkin et al. | 707/754 |
| 7,181,731 | B2 * | 2/2007 | Pace et al. | 717/136 |
| 7,730,482 | B2 * | 6/2010 | Illowsky et al. | 717/177 |
| 7,761,863 | B2 * | 7/2010 | Illowsky et al. | 717/167 |
| 2003/0050932 | A1 * | 3/2003 | Pace et al. | 707/100 |
| 2003/0051236 | A1 * | 3/2003 | Pace et al. | 717/177 |
| 2003/0074360 | A1 * | 4/2003 | Chen et al. | 707/100 |
| 2003/0172135 | A1 * | 9/2003 | Bobick et al. | 709/220 |
| 2003/0184584 | A1 * | 10/2003 | Vachuska et al. | 345/762 |
| 2004/0249830 | A1 * | 12/2004 | Sonkin et al. | 707/100 |

* cited by examiner

*Primary Examiner* — Van Nguyen
(74) *Attorney, Agent, or Firm* — Kilpatrick Townsend & Stockton LLP

(57) ABSTRACT

Systems and methods which facilitate extension of software applications, without changing the software application binary code, through use of a data channel architecture are shown. According to embodiments, a robust bi-directional data channel is implemented within the software application allowing interaction with external code to provide extension of the software application to include one or more new and/or modified feature. Embodiments adapt a software application for loading of a trigger and an extension library for interfacing a feature module with the software application. The trigger may comprise a small piece of code, such as in a scripting language, adapted to be embedded in the software application at runtime which directs processing to a corresponding extension library. The extension library may comprise a command set, such as a scripting language dynamic link library or bundle, used for implementing a robust bidirectional protocol between the software application and external code.

10 Claims, 4 Drawing Sheets

SYSTEMS AND METHODS FOR EXTENSION OF SOFTWARE FEATURES WITHOUT CHANGING THE HOST SOFTWARE BINARY CODE

TECHNICAL FIELD

The invention is related generally to software feature extension and, more particularly, to extension of software features without changing the host software binary code.

BACKGROUND OF THE INVENTION

Software applications, particularly commercially available software applications, are often quite complex, offering a variety of features and functions to the user. For example, various word processing, data management, accounting, illustration, animation, and development software applications have been available for a number of years. As computing power and resources have advanced, and as user's and their needs have become more advanced, such software applications have incorporated more features and functions and have generally become more robust and complicated.

Such advancements are continual, resulting in different versions of a particular software application being released over time. For example, as a fundamental change in a software application is developed, such as to accommodate a new operating system, a new file structure, a new processor, a fundamentally new or different feature, etc., the software application may be re-released as a new version (e.g., progressing from version 1.0 to version 2.0). Such version releases typically entail a substantial rewrite of the underlying binary code, or portions thereof, and may on occasion entail a complete rewrite of the underlying binary code. As can be appreciated, such version releases require substantial effort on the part of the developer to both create the software application binary code and to perform quality assurance in order to avoid releasing a non-functional or otherwise unsatisfactory version of the software. In particular, the entire software application typically must be re-tested, although only a small feature has been added, resulting in substantial time and effort being invested in the software application version update. It is not unusual for such efforts to cost a developer millions of dollars in order to release a new version of a software application. Accordingly, many software companies delay or forego completely the introduction of features which would otherwise enhance their software application.

Oftentimes it is desired to add a feature to, or modify a feature in, a software application which, although highly desirable, does not in itself warrant a version upgrade. Accordingly, although it is possible to introduce such a feature or change in a feature through the above described rewriting of the underlying binary code, such an undertaking is generally not practical for the introduction of an otherwise minor modification to the software application. Even where no fundamental changes to the software application are necessary to add a particular feature and only a relatively small amount of the software application binary code is affected by the revisions necessary to add the feature, and thus a "dot" release (e.g., progressing from version 1.0 to version 1.1) is possible rather than a full version release, substantial development and quality assurance efforts are typically implicated.

Accordingly, software developers have sometimes precoded protocols in software applications for interfacing the software application with later developed code in order to accommodate release of new features. For example, application programming interfaces (APIs) have been coded into releases of software applications in anticipation of the addition of later developed features. One or more feature may then be provided in a bit of code typically referred to as a "plug-in," wherein the plug-in interfaces with the software application through the API to provide operation of the features. However, such APIs must be provided with all the appropriate protocols, software hooks, links, etc. in order to properly interact with the yet to be developed plug-in, and perform, the later developed features. Such a level of interfacing has generally been found to either require that the feature to be released in the future be substantially developed at the time the software application API is developed or that unusually accurate prophetic development of the API be done in order to provide desired and complete operation of the new feature with the software application.

Because of the relatively well defined and rigid interface provided by such APIs, even where the API has been properly configured to support a later developed feature through its associated plug-in, integration of the added feature has often been less than ideal. For example, interaction through such APIs has often provided a user experience in which it is clear that the added feature is not native to the software application. The user's interaction often requires steps or processes which are outside of, or otherwise different from, the steps or processes native to the software application. Moreover, the user interface presented by the plug-in through use of the API is often limited and/or does not result in a look and feel which is homogenous with that of the software application. Additionally, the number and types of functions that may be included in the user interface is limited by the API.

Another technique used by software developers for providing software applications with later developed features has been to provide predefined components within the software application. Such components include various software objects, such as software buttons, dialog boxes, etc., which may be accessed and used later to present a new feature. In essence, these components are predefined APIs and plug-ins which may be aggregated to provide a new feature. As with the APIs and plug-ins discussed above, the use of such components has been less than ideal. Because these components predefine the user interface components, the resulting user interface has been found to be draconian, lacking the ability to accommodate even minor variations. Accordingly, the result is a feature wherein it is clear that it is not native to the software application and a user interface which, in addition to being very limited, does not result in a look and feel which is homogenous with that of the software application. Additionally, the number and types of functions that may be included are limited to those predefined as components.

BRIEF SUMMARY OF THE INVENTION

The present invention is directed to systems and methods which facilitate extension of software applications, without changing the software application binary code, through use of a data channel architecture. According to embodiments of the invention, a robust bi-directional data channel is implemented within the software application allowing interaction with external code, referred to herein as a feature module, to provide extension of the software application to include one or more new and/or modified feature (referred to herein as an extension feature). Creation of such a data channel, and the associated interaction with a feature module, does not involve modification to the software application binary code. Moreover, the data channel architecture of embodiments accommodate a rich and open user interface with the feature module while facilitating a wide variety of features, without the need to pre-code or predict feature specific protocols within the software application.

An extension feature is provided according to embodiments of the invention wherein the user experience cannot readily detect that the extension feature was not a software application native feature. For example, when accessing an extension feature of embodiments, the user performs steps or processes which are consistent with the steps or processes native to the software application. Moreover, the user interface presented by the extension feature of embodiments provides a look and feel which is homogenous with that of the software application.

A preferred embodiment of the invention adapts the software application for loading of a trigger and an extension library for interfacing a feature module with the software application. The trigger preferably operates to activate the extension library as an extension feature is desired. The extension library establishes a data channel within the software application and interfaces with the feature module to provide a desired feature. Because the software application need not be specifically adapted for the particular feature module, but rather is adapted to load triggers and their associated extension libraries, the software application is readily extended without modification to the binary code to provide features which were not, and could not have been, envisioned at the time the software application binary code was released.

A trigger of embodiments of the present invention comprise a small piece of code adapted to be embedded in an appropriate portion of the software application at runtime. This code preferably directs processing operation to a corresponding extension library when executed, thereby invoking an extension feature at an appropriate or desired point in the execution of the software application. For example, a trigger of an embodiment of the invention comprises a single line JAVASCRIPT file, or other suitable scripting language file, which is loaded upon launching the host software application. The JAVASCRIPT file, or loading of the file by the software application, may place a selection tag at one or more places in the software application, such as to place an entry in a pull-down menu or within a dialog box, for selection of the associated extension feature by a user. When executed, such as when selected by a user, the JAVASCRIPT file preferably directs execution to the corresponding extension library.

An extension library of embodiments of the invention comprises a command set used for implementing a robust bidirectional protocol between the software application and feature module. This command set preferably establishes a data channel wherein a wide range of data acquisition, manipulation, storage, and communication is supported. Moreover, control interaction, such as to invoke one or more processes in one of the software application or feature module by the other one of the software application and feature module. For example, an extension library of an embodiment of the invention comprises a JAVASCRIPT dynamic link library (DLL) or bundle (when implemented in the WINDOWS operating system or the MAC OS operating system respectively), or other suitable scripting language library, which interacts with a host software application and a feature module through the use of a well defined, and preferably standardized, command set. When called, the JAVASCRIPT extension DLL preferably provides a data channel wherein the foregoing command set may be used to provide precise data acquisition, manipulation, storage, and/or communication and control commands as desired to provide an extension feature. The use of a JAVASCRIPT extension DLL to provide a data channel according to embodiments of the invention is referred to herein as a JAVASCRIPT extension.

In operation according to a preferred embodiment, a trigger file and a corresponding extension library file are stored in a predetermined location or locations, such as within a particular directory or folder. A software application adapted according to embodiments of the invention operates to examine the predetermined location upon launching and load the trigger file and extension library, thereby automatically adapting the software application for operation with an extension feature.

One or more files in addition to the foregoing trigger and extension library may be utilized in adapting a software application for operation with an extension feature according to embodiments of the invention. For example, a manifest file, or other suitable metadata type file, may be utilized to associate a particular trigger with a particular extension library. According to one embodiment, an extensible markup language (XML) manifest file is used to associate an "OPEN" command of a trigger JAVASCRIPT file with the appropriate JAVASCRIPT extension DLL.

Feature modules of embodiments of the invention may comprise any number of configurations. Such feature modules are preferably executable code blocks, such as may be written in programming languages such as C++, C#, Visual J++, Visual J#, Visual Basic, JAVA etc., launched under control of a host software application via a command issued through a data channel of an embodiment of the invention. The feature module is thus operable to provide operation of an extension feature, exchanging data with the software application as needed or desired. Robust command protocols available through the extension library of embodiments of the invention facilitate a feature module's ability to obtain various data from the software application, to provide data thereto, and/or to provide control commands therebetween. Accordingly, very close integration between the software application and the extension feature is achieved according to embodiments of the invention. Moreover, the feature module may provide a very rich application without draconian or overly restrictive limitations being placed on the interface between the extension module and host software application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

A preferred embodiment of the invention adapts a software application for loading of code for creating a bidirectional data channel in order to facilitate extension of the software application, without changing the software application binary code. Accordingly, embodiments of the invention load a trigger and an extension library for interfacing a feature module with the software application. The trigger preferably operates to activate the extension library as an extension feature is desired. The extension library establishes a data channel within the software application and interfaces with the feature module to provide a desired feature.

From the above, it can be appreciated that elements of the present invention may be implemented in software such that code segments perform operation as described herein. The code segments can be stored in a computer readable medium. Such a computer readable medium may include any medium that can store or transfer information for use by a computer system. Examples of a computer readable medium include an electronic circuit, a semiconductor memory device, a read only memory (ROM), a flash memory, an erasable ROM (FROM), a floppy diskette, an optical memory (e.g., compact disk ROM (CD-ROM)), a hard disk, etc. The code segments may be downloaded via computer networks such as the Internet, an intranet, a local area network (LAN), a wide area network (WAN), a wireless network, the public switched telephone network (PSTN), etc.

Figure 1:
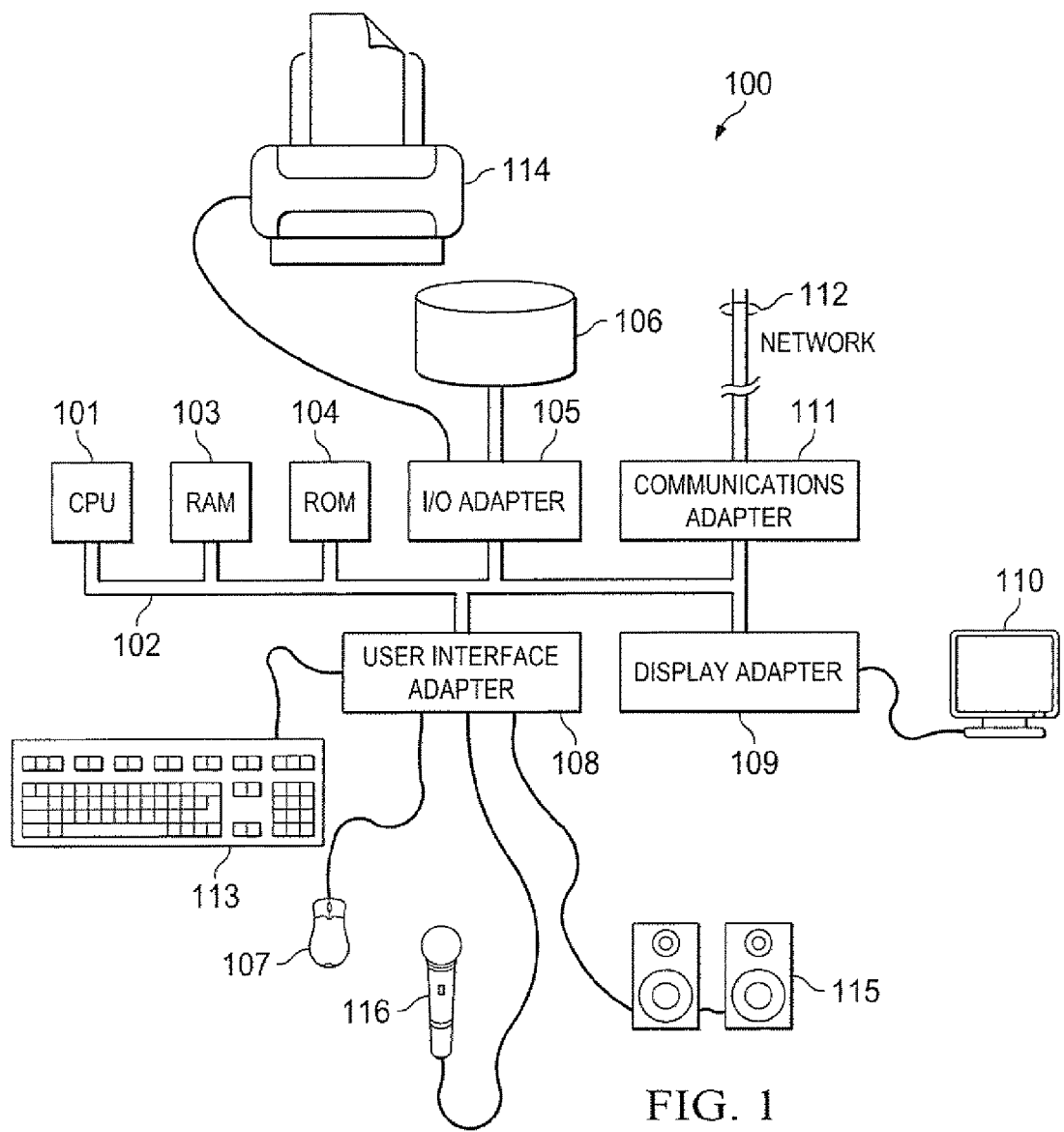
FIG. 1 shows a block diagram of a computer system adapted to use the present invention.

FIG. 1 shows computer system 100 adapted to use an embodiment of the present invention. Central processing unit (CPU) 101 of the illustrated embodiment is coupled to system bus 102. The CPU 101 may be any general purpose CPU, such as a processor from the PENTIUM family of processors available from Intel Corporation or from the POWER family of processors available from the AIM Alliance (Apple Inc., International Business Machines Corp., and Motorola, Inc.). However, the present invention is not restricted by the architecture of CPU 101 as long as CPU 101 supports the inventive operations as described herein. Bus 102 is coupled to random access memory (RAM) 103, such as may be SRAM, DRAM, SDRAM, etc., which may be used in loading and executing software applications, trigger files, extension library files, and feature modules of embodiments of the invention. ROM 104 is also coupled to bus 102, which may be PROM, EPROM, or EEPROM. RAM 103 and ROM 104 may be used to hold user and system data and programs as is well known in the art.

Bus 102 is also coupled to input/output (I/O) controller card 105, communications adapter card 111, user interface adaptor 108, and display adaptor 109. I/O adapter card 105 of the illustrated embodiment connects to storage device 106, such as may comprise one or more of a hard drive, a CD drive, a floppy disk drive, a tape drive, to the computer system. I/O adapter 105 of the illustrated embodiment is also connected to printer 114, which would allow the system to print paper copies of information such as document, photographs, articles, etc. Note that printer 114 may comprise a traditional printer (e.g., a dot matrix printer, a laser printer, an ink jet printer, etc.), a fax machine, a copier machine, and/or the like. Communications card 111 is adapted to couple computer system 100 to network 112, which may be one or more of the Internet, an intranet, a local area network (LAN), a wide area network (WAN), a wireless network, the public switched telephone network (PSTN), etc. User interface adaptor 108 couples user input devices, such as keyboard 113, pointing device 107, and microphone 116, to computer system 100. User interface adaptor 108 of the illustrated embodiment also couples user output devices, such as to provides sound output to a user via speaker(s) 115. Display adaptor 109 is driven by CPU 101 to control the display on display device 110.

Figure 2:
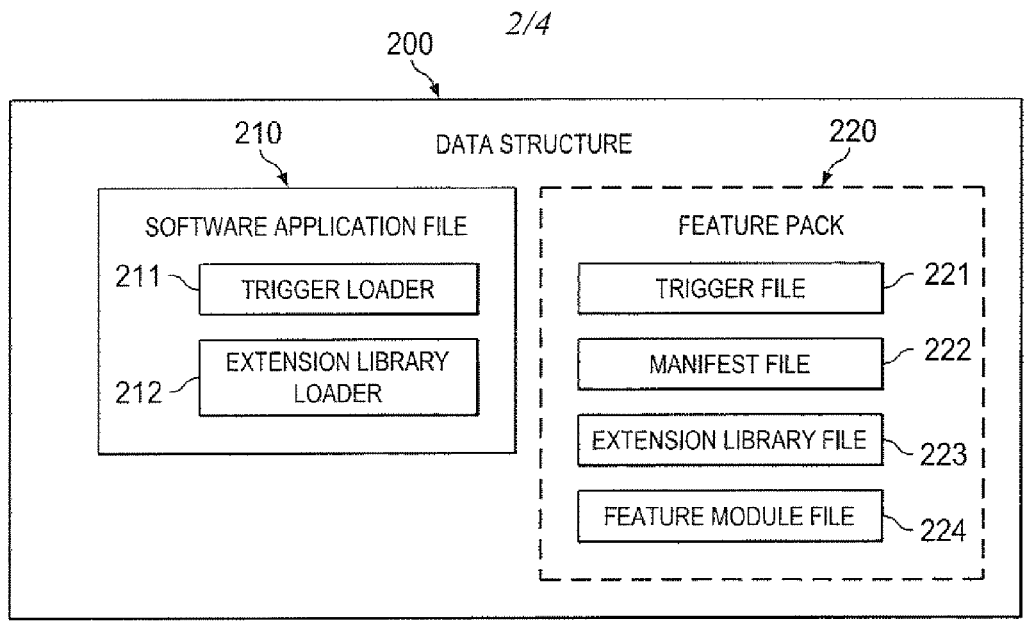
FIG. 2 shows a block diagram of a software application and feature pack adapted according to an embodiment of the invention.

In adapting a software application to interface with an extension feature of the present invention, one or more extension code loaders are provided within the software application according to embodiments of the invention. For example, software application file 210 of FIG. 2 is shown having trigger loader 211 and extension library loader 212 according to an embodiment of the invention.

Software application file 210 of embodiments comprises one or more files containing the binary code of a particular software release stored within data structure 200. Data structure 200 comprises a file system, for example, such as may be operable with storage device 106 (FIG. 1) to store various programs and data. The particular software release represented by software application file 210 is not important to understanding the concepts of the present invention. However, it should be appreciated that software application file 210 may comprise various word processing, data management, accounting, illustration, animation, development software applications, and/or the like as may be made commercially available, or as otherwise may be made available.

In operation, an extension code loader of embodiments of the present invention is operable to detect one or more extension files, such as trigger file 221, manifest file 222, and/or extension library file 223 of feature pack 220, and cause appropriate portions thereof to be loaded into a runtime rendition of software application file 210 for operation as described herein. Accordingly, operation of extension code loaders, such as trigger loader 211 and extension library loader 212, provide high level or feature generic receivers within the software application for interfacing a runtime rendition of software application file 210 with any number of feature modules, such as feature module file 224 of feature pack 220, according to embodiments of the invention.

Figure 3:
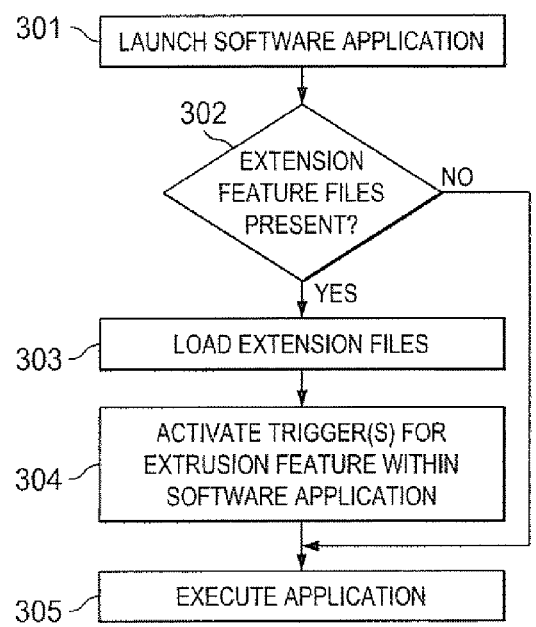
FIG. 3 shows a flow diagram of operation to automatically adapt a software application for operation with an extension feature according to an embodiment of the present invention.
Figure 4A:
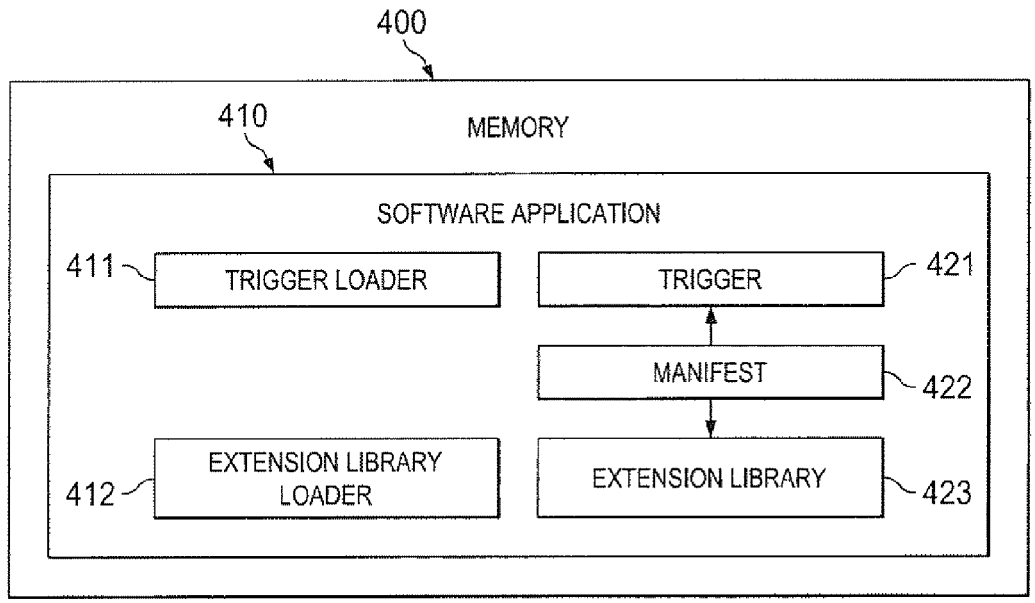
FIGS. 4A and 4B show block diagrams of a software application adapted for operation with an extension feature according to an embodiment of the present invention.

Operation of a software application, and an extension code loader thereof, to load code of one or more extension file into a runtime rendition of the software application and thereby automatically adapt the software application for operation with an extension feature is shown in the flow diagram of FIG. 3. At block 301 of FIG. 3, a software application, such as software application file 210, adapted according to an embodiment of the present invention is launched. Launching of the software application preferably operates to copy a runtime rendition of a software application file, such as software application file 210, into the memory of a host computer system, such as RAM 103 of computer system 100 for execution by a processor thereof, such as CPU 101. FIG. 4A shows software application 410, preferably comprising a runtime rendition of software application file 210, loaded in memory 400, such as may correspond to RAM 103, as a result of a launching process.

At block 302, code of an extension code loader, such as trigger loader 411 and extension library loader 412, operates to detect if appropriate extension files are present, thereby indicating that an extension to the software application is present. According to a preferred embodiment, extension files are placed in a predetermined location or locations, such as within a particular directory or folder of data structure 200. For example, one or more of trigger file 221, manifest file 222, extension library file 223, and feature module file 224 of feature pack 220 may be stored within a particular directory of data structure 200 to facilitate detection by one or more of trigger loader 411 and extension library loader 412. Accordingly, trigger loader 411 and/or extension library loader 412 preferably operate to examine the predetermined location(s) upon launching software application 410 to detect one or more appropriate extension files.

It should be appreciated that the extension files of feature pack 220 of the illustrated embodiment may each be stored in a same location (directory, folder, etc.) within data structure 200 or any combination of locations, as desired. For example, trigger file 221 and manifest file 222 may be stored in a particular location selected for identification and loading by trigger loader 411 as described above. However, extension library file 223 and/or feature module file 224 may be stored in a different location. For example, where extension library file 223 comprises a dynamic link library (DLL), as used in WINDOWS based computer systems, or a bundle, as used in MAC-OS based computer systems, extension library file 223 may be stored in a directory or folder designated for such file types. Additionally or alternatively, feature module file 224 may be stored in a directory or folder designated for execution files.

If, at block 302, the extension code loader does not detect the appropriate extension files, processing according to the illustrated embodiment proceeds to block 305 wherein software application 410 is executed without any extension. That is, software application 410 is executed in the form of its original release. However, if the extension code loader detects the appropriate extension files, processing according to the illustrated embodiment proceeds to block 303 for extension of the runtime rendition of the software application according to the present invention.

At block 303, the extension code loader, such as trigger loader 411 and extension library loader 412, operates to load appropriate extension files, such as trigger file 221, manifest file 222, and/or extension library file 223 of feature pack 220, into a runtime rendition of the software application, such as software application 410. For example, trigger 421, manifest 422, and extension library 423 may be loaded into software application 410 as shown in FIG. 4A.

Trigger 421 preferably comprise a small piece of code adapted to be embedded in an appropriate portion of software application 410. For example, trigger 421 may be loaded as function or routine which is accessible at one or more points in the execution of software application 410.

In association with loading trigger 421 into software application 410, trigger loader 411 may place and activate selection tags or function calls within one or more points of software application 410 for invoking an extension function as desired, as shown in block 304. For example, one or more pull down menu may have a selection added thereto (e.g., a menu item) for calling trigger 421. Similarly, one or more dialog boxes may have a selection added thereto (e.g., a check box, a radio button, etc.) for calling trigger 421. Additionally or alternatively, one or more points within software application 410 may be modified to call trigger 421 as code is executed.

The particular locations within software application 410 where trigger 421 is placed may be predefined upon release of the software application, such as by trigger loader 411 having been coded to load trigger 421 and/or its associated selection tags or function calls into particular places within software application 410. Additionally or alternatively, the particular locations within software application 410 where trigger 421 is placed may be defined by the extension, such as by including data within feature pack 220 (e.g., within trigger file 221 and/or manifest file 222) to indicate where trigger 421 and/or its associated selection tags or function calls are to be placed within software application 410.

Trigger 421 preferably includes code for directing processing operation of software application 410 to a corresponding extension library, such as extension library 423, when executed, thereby invoking an extension feature at an appropriate or desired point in the execution of the software application. For example, a trigger of an embodiment of the invention comprises a single line of JAVASCRIPT, or other suitable scripting language, which is loaded upon launching the host software application. The JAVASCRIPT may contain a command, such as "OPEN [NAME]", wherein [NAME] comprises a name of the corresponding extension library. Accordingly, when executed, such as when selected by a user, the JAVASCRIPT command directs execution of software application 410 to the corresponding extension library.

Metadata, such as provided by manifest 422, provides information to associate trigger 421 with extension library 423. According to one embodiment, manifest 422 comprises an extensible markup language (XML) entry identifying [NAME] as used in the foregoing trigger JAVASCRIPT with extension library 423. Accordingly, manifest 422 of embodiments is used to associate trigger 421 with extension library 423.

Figure 4B:
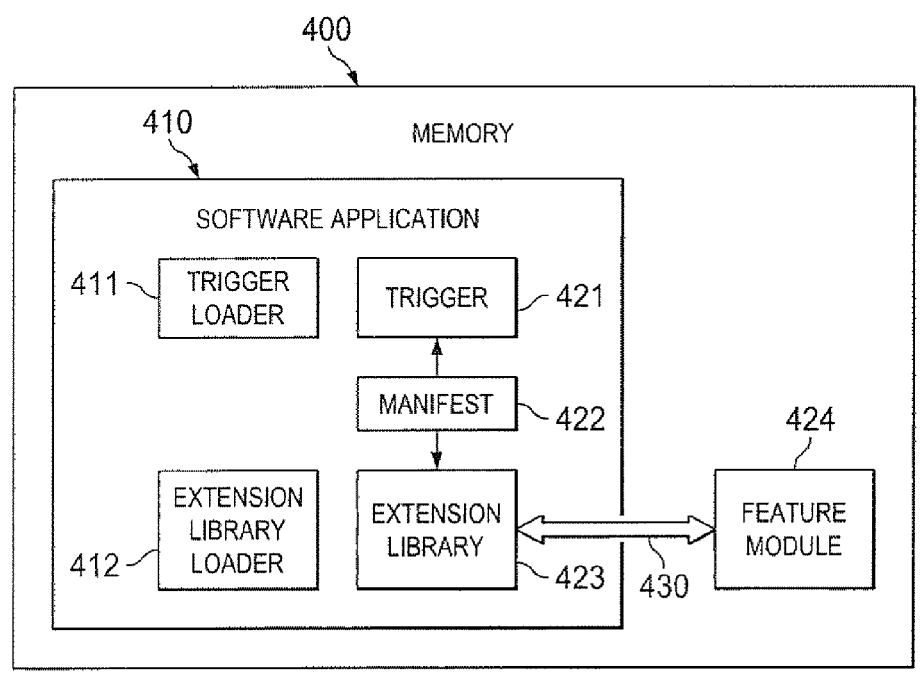

Extension library 423 preferably comprises a command set for implementing a robust bidirectional protocol between software application 410 and a feature module, such as feature module 424 of FIG. 4B. This command set preferably establishes a data channel, such as data channel 430 of FIG. 4B, wherein a wide range of data acquisition, manipulation, storage, and communication is supported. Moreover, control interaction, such as to invoke one or more processes in one of the software application or feature module by the other one of the software application and feature module.

Extension library 423 of embodiments comprises a JAVASCRIPT extension DLL or bundle, or other suitable scripting language library, which interacts with a host software application and a feature module through the use of a well defined, and preferably standardized, command set. It should be appreciated that such DLLs or bundles, although loaded with an associated software application, remain dormant until called. When called, the JAVASCRIPT extension DLL preferably provides data channel 430 through which the foregoing command set may be used to provide precise data acquisition, manipulation, storage, and/or communication and control commands as desired to provide an extension feature. For example, embodiments of extension library 423 provide robust, generic access to runtime objects of a host software application, such as through the use of existing application programming interfaces (APIs) to get/set many attributes of the software application, open documents, access the objects and their attributes, etc. Extension library 423 of embodiments of the invention includes a document object model (DOM) which facilitates access to all open documents and the hierarchical contents of those documents. Additionally or alternatively, extension library 423 of embodiments may include application-specific APIs which facilitate access to one or more aspects of the host software application. Using extension library 423, providing data channel 430, according to embodiments of the invention, extension features are provided access to the entire scripting (extensibility) layer, and therefore are provided a large amount of control and flexibility with respect to the host software application.

After the extension files are loaded and their associated triggers are activated, processing according to the illustrated embodiment proceeds to block 305 wherein execution of software application 410 proceeds. Unlike execution of software application 410 when the extension code loader does not detect the appropriate extension files, software application 410 when the extension code loader detects the appropriate extension files is executed with an extension. That is, software application 410 is extended to execute with an extension feature as provided by feature pack 220 without requiring any changes to the code of software application file 210 and without the predefined application programming interfaces (APIs) having been coded into software application file 210 specifically adapted for interfacing with feature module 424.

Figure 5:
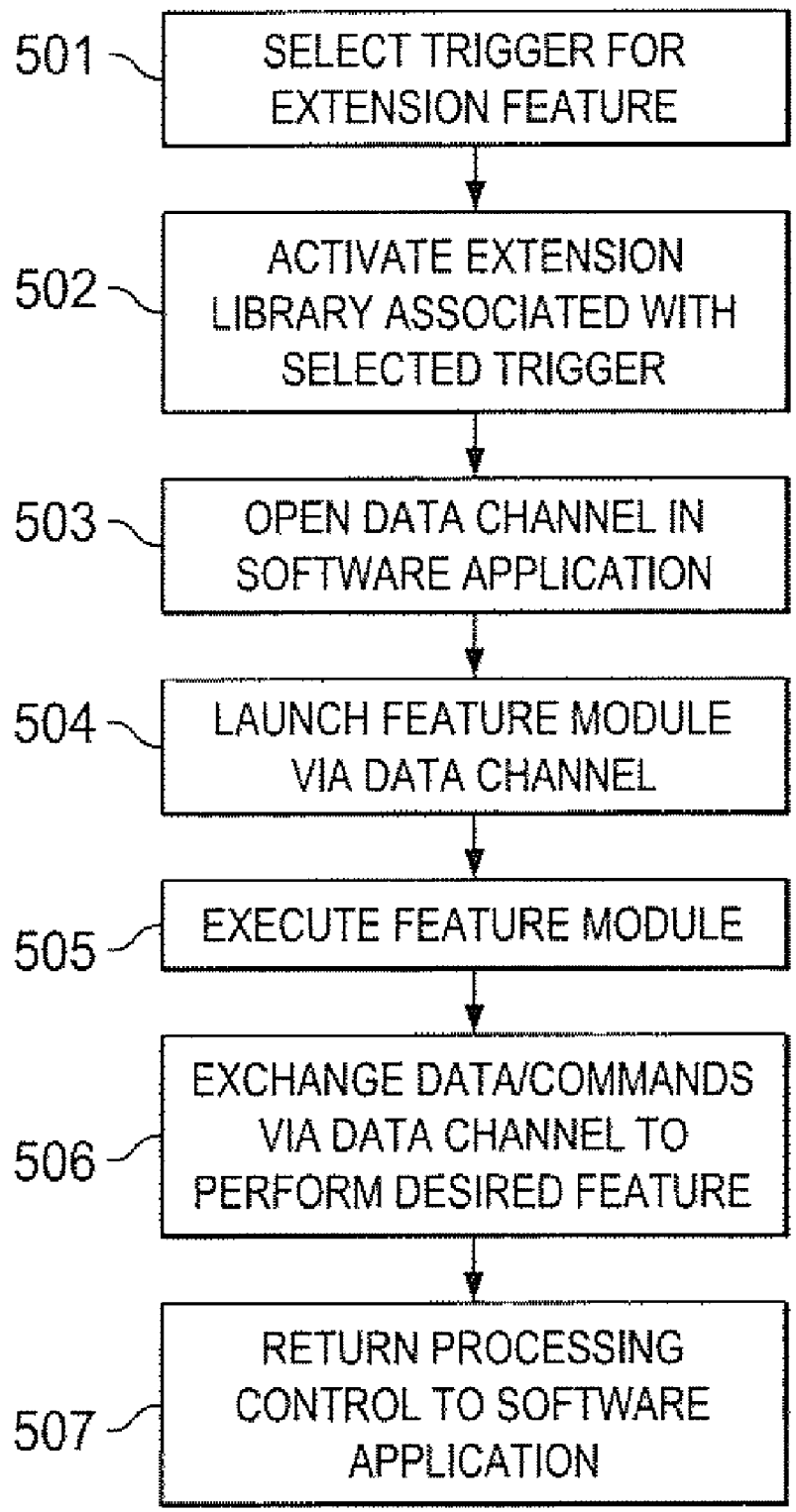
FIG. 5 shows a flow diagram of integrated operation of a software application and feature module according to an embodiment of the invention.

Having adapted the runtime rendition of the software application for an extension feature according to an embodiment as described above, attention is directed toward FIG. 5 wherein the flow diagram shown therein illustrates operation to provide an extension feature according to embodiments of the invention. It should be appreciated that the processes of FIG. 5 are performed during execution of a software application adapted according to the present invention, such as during processing of block 305 of FIG. 3.

At block 501 a trigger, such as trigger 421, is selected to invoke execution of a selected extension feature. For example, a user may activate or select a selection tag or function call disposed at one or more points within software application 410. The user may access a pull down menu and select an entry corresponding to trigger 421, thereby causing trigger 421 to execute. Similarly, the user may "check" or "click" a portion of a dialog box and select an entry corresponding to trigger 421, thereby causing trigger 421 to execute. Additionally or alternatively, execution of software application 410 may itself encounter a call to trigger 421, thereby causing trigger 421 to execute.

At block 502, the trigger causes an extension library, such as extension library 423, associated therewith to be activated. For example, where extension library 423 comprises a DLL or bundle which is dormant upon loading, the trigger makes a call to the extension library to thereby direct execution of the software application thereto. According to a preferred embodiment, trigger 421 executes a JAVASCRIPT "OPEN" command, such as in the form of "OPEN [NAME]", to direct execution of software application 410 to extension library 423. Manifest 422 may provide metadata to associate "[NAME]", as set forth in the JAVASCRIPT "OPEN" command of trigger 421, with extension library 423.

The extension library opens a data channel, such as data channel 430, within the software application for communication to provide an extension feature of the present invention. According to a preferred embodiment, wherein the extension library comprises a JAVASCRIPT DLL, the data channel comprises a JAVASCRIPT command interface operable to communicate bidirectionally with an associated feature module. Using such a JAVASCRIPT command interface, embodiments of the invention provide access to all the functionality, data, and objects of the running software application, and are not limited to pre-defined plug-in APIs as have heretofore been used.

It should be appreciated that, because the data channel provided according to embodiments of the invention provides core access to the software application, various protocols may be utilized to prevent or discourage unauthorized or undesired interfacing with the software application. For example, the extension library may invoke encryption with respect to communications made via the data channel. Additionally or alternatively, clear text protocols, such as to append a keyword (e.g., the name of the feature module) to communications made via the data channel, may be implemented according to embodiments of the invention.

At block 504, the extension library of the illustrated embodiment communicates via the data channel, issuing a command sequence to launch a runtime rendition of a feature module file, such as to provide feature module 424 of FIG. 4B within memory 400 from feature module file 224 of FIG. 2. The feature module preferably provides code which when executed operates to provide a desired feature.

At block 505, the feature module is executed to provide a desired feature. For example, feature module 424 may comprise code written in a programming language such as C++, C#, Visual J++, Visual J#, Visual Basic, JAVA etc., which when executed by CPU 101 provides operation to result in one or more desired features being performed. It should be appreciated that, because feature modules of embodiments of the present invention comprise separate executable modules, the feature module may be created from a different programming language than that used to create software application 410.

Execution of the feature module is operable to provide an extension feature, exchanging data with the software application as needed or desired. Accordingly, at block 506 data and/or commands are exchanged between the feature module and software application to perform the desired feature.

Robust command protocols available through the extension library of embodiments of the invention facilitate a feature module's ability to obtain various data from the software application, to provide data thereto, and/or to provide control commands therebetween. Accordingly, very close integration between the software application and the extension feature is achieved according to embodiments of the invention. Moreover, the feature module may provide a very rich application without draconian or overly restrictive limitations being placed on the interface between the extension module and host software application. Accordingly, a user interface provided by the feature module, such as feature module 424, may be made to appear consistent or homogeneous with that of the software application, such as software application 410, although the user interface may provide access to functions not available or contemplated when the software application was released.

Having completed providing the extension feature, block 507 returns processing control to the software application for continued processing thereby. For example, after having performed a desired extension feature, feature module 424 may store a result and/or provide resulting data to software application 410 and then return the processing sequence to software application 410. Feature module 424 may terminate and stay resident in memory 400 or may be removed from memory 400 in order to free resources for other uses.

Although embodiments have been discussed above with reference to a single feature module, it should be appreciated that the concepts of the present invention may be applied to embodiments wherein a plurality of feature modules are interfaced with a software application. For example, multiple feature packs, each containing a different feature module, may be loaded and executed with respect to a software application substantially as described above. Likewise, multiple versions of an extension feature may be made available and/or executed with respect to a software application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a processor configured to execute instructions stored in a non-transitory computer-readable medium providing an application;
wherein the application comprises:
an extendable software application file, wherein said extendable software application file lacks an application programming interface corresponding to an extension feature; and
a feature pack module including a plurality of files, wherein said feature pack module is configured to provide said extension feature in response to code of at least one file of said plurality of files being loaded into a runtime rendition of said extendable software application file;
a trigger loader module configured to load trigger code into the runtime rendition of the extendable software application file, said trigger code configured to access an extension library of the feature pack module; and
an extension library loader module configured to load the extension library into the runtime rendition of the extendable software application file,
wherein the extension library is configured to initiate a data channel providing an interface between the runtime rendition of the extendable software application file and the feature pack module such that the runtime rendition of the extendable software application file is configured to use the extension feature for which the extendable software application file lacks the application programming interface,
wherein said plurality of files comprise:
a trigger file providing said trigger code, said trigger file comprising a file of said at least one file of said plurality of files loaded into said runtime rendition of said extendable software application file; and
an extension library file providing said extension library, said extension library file comprising a file of said at least one file of said plurality of files loaded into said runtime rendition of said extendable software application file, and
wherein said extension library comprises a command set, wherein the command set is configured for implementing a bidirectional protocol between the runtime rendition of said extendable software application file and a runtime rendition of code operable to provide said extension feature.

2. The system of claim 1, wherein at least one of the trigger loader module and the extension library loader module is configured to detect the plurality of files of the feature pack module in response to the runtime rendition of the extendable software application file being loaded, wherein a file of the plurality of files is stored in a predetermined location in a data structure for detection by at least one of the trigger loader module and the extension library loader module, wherein detection of the file by the at least one of the trigger loader module and the extension library loader module indicates an extension feature is present for the extendable software application file.

3. The system of claim 1, wherein said plurality of files further comprise:
a metadata file identifying said extension library to said trigger code.

4. The system of claim 1, wherein said trigger file comprises a scripting language command to invoke said extension library, and wherein said extension library comprises a scripting language library.

5. The system of claim 4, wherein said extension library is selected from the group consisting of a dynamic link library and a bundle.

6. The system of claim 4, wherein said extension library comprises a JAVASCRIPT library.

7. A method comprising:
providing a feature pack module including a plurality of files for extending a feature set of a software application lacking an application programming interface for using an extension feature of the feature pack module;
loading trigger code into a runtime rendition of said software application in response to the software application being executed, wherein the trigger code initiates a command accessing an extension library of the feature pack module having the extension feature;
loading the extension library into the runtime rendition of said software application;
accessing said extension library to initiate a data channel between the runtime rendition of said software application and the feature pack module; and
interfacing, the runtime rendition of said software application with the feature pack module via the data channel such that the runtime rendition of the software application is configured to use the extension feature for which the software application lacks the application programming interface,
wherein said plurality of files comprise:
a trigger file providing said trigger code, said trigger file comprising a file of said at least one file of said plurality of files loaded into said runtime rendition of said software application; and
an extension library file providing said extension library, said extension library file comprising a file of said at least one file of said plurality of files loaded into said runtime rendition of said software application, and
wherein said extension library comprises a command set, wherein the command set is configured for implementing a bidirectional protocol between the runtime rendition of said software application and a runtime rendition of code operable to provide said extension feature.

8. The method of claim 7, wherein said extension library comprises a scripting language library.

9. The method of claim 8, wherein said extension library comprises a JAVASCRIPT library.

10. The method of claim 7, wherein said trigger code comprises a scripting language command.

* * * * *